US007707508B1

(12) United States Patent  
Moskalonek et al.

(10) Patent No.: US 7,707,508 B1  
(45) Date of Patent: Apr. 27, 2010

(54) METHODS AND APPARATUS FOR EFFICIENT LAYOUT OF DIGITAL CONTENT

(75) Inventors: Christoph Moskalonek, San Francisco, CA (US); Arno Gourdol, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 457 days.

(21) Appl. No.: 11/638,152

(22) Filed: Dec. 12, 2006

(51) Int. Cl.  
*G06F 15/00* (2006.01)  
*G06F 13/00* (2006.01)

(52) U.S. Cl. .................... 715/762; 715/763
(58) Field of Classification Search ............. 715/503, 715/700, 762–765, 851–853, 840, 517, 751, 715/788, 803

See application file for complete search history.

(56) References Cited

U.S. PATENT DOCUMENTS

2006/0117253 A1* 6/2006 Polash ................. 715/517  
2006/0206800 A1* 9/2006 Agrawal et al. .......... 715/503

* cited by examiner

*Primary Examiner*—Kevin Nguyen  
(74) *Attorney, Agent, or Firm*—Chapin IP Law, LLC

(57) ABSTRACT

Methods, software and a system for providing an efficient layout of digital content are presented. A plurality of digital content is received and rendered in a plurality of layouts. Each of the plurality of layouts comprises the plurality of digital content arranged in a plurality of cells within the layout. The white space area is calculated a white space area for each of the plurality of layouts. The white space area comprises a cumulative area calculated from an area within each of the cells not contained by the respective digital content. A layout is selected, from the plurality of layouts, for rendering within a layout region, based on the white space area.

21 Claims, 9 Drawing Sheets

216 RENDER THE PLURALITY OF DIGITAL CONTENT IN A PLURALITY OF LAYOUTS, EACH OF THE PLURALITY OF LAYOUTS COMPRISING THE PLURALITY OF DIGITAL CONTENT ARRANGED IN A PLURALITY OF CELLS WITHIN THE LAYOUT

217 RENDER EACH OF THE PLURALITY OF DIGITAL CONTENT WITHIN EACH OF THE RESPECTIVE CELLS WITHIN THE PLURALITY OF CELLS, EACH OF THE DIGITAL CONTENT RENDERED MAINTAINING AN ASPECT RATIO OF EACH OF THE DIGITAL CONTENT WITHIN EACH OF THE RESPECTIVE CELLS

218 IDENTIFY A CELL HEIGHT AND A CELL WIDTH FOR EACH OF THE CELLS

219 IDENTIFY A DIGITAL CONTENT HEIGHT AND A DIGITAL CONTENT WIDTH FOR EACH OF THE DIGITAL CONTENT

220 IDENTIFY A FIRST DIMENSION OF THE CELL, THE FIRST DIMENSION SELECTED FROM THE CELL HEIGHT AND THE CELL WIDTH

221 IDENTIFY A FIRST DIMENSION OF THE DIGITAL CONTENT, THE FIRST DIMENSION SELECTED FROM THE DIGITAL CONTENT HEIGHT AND THE DIGITAL CONTENT WIDTH

222 MODIFY THE FIRST DIMENSION OF THE DIGITAL CONTENT TO EQUAL THE FIRST DIMENSION OF THE CELL

223 PROPORTIONALLY MODIFY A SECOND DIMENSION OF THE DIGITAL CONTENT TO FIT WITHIN THE CELL, THE SECOND DIMENSION OF THE DIGITAL CONTENT NOT SELECTED AS THE FIRST DIMENSION, THE MODIFYING OF THE SECOND DIMENSION OF THE DIGITAL CONTENT MAINTAINING THE ASPECT RATIO OF THE DIGITAL CONTENT

*FIG. 6*

224 CALCULATE A WHITE SPACE AREA FOR EACH OF THE PLURALITY OF LAYOUTS, THE WHITE SPACE AREA COMPRISING A CUMULATIVE AREA CALCULATED FROM AN AREA WITHIN EACH OF THE CELLS NOT CONTAINED BY THE RESPECTIVE DIGITAL CONTENT

225 FOR EACH OF THE CELLS WITHIN EACH OF THE PLURALITY OF LAYOUTS, DETERMINE THE WHITE SPACE AREA BY CALCULATING A DIFFERENCE BETWEEN:
i) AN AREA OF THE CELL, THE AREA OF THE CELL COMPRISING A HEIGHT AND WIDTH OF THE CELL
ii) AN AREA OF THE DIGITAL CONTENT WITHIN EACH OF THE CELLS, THE AREA OF THE DIGITAL CONTENT COMPRISING A HEIGHT AND WIDTH OF THE DIGITAL CONTENT

226 FOR EACH OF THE LAYOUTS WITHIN THE PLURALITY OF LAYOUTS, CALCULATING A CUMULATIVE WHITE SPACE AREA COMPRISING A SUMMATION OF EACH OF THE WHITE SPACE AREAS FOR EACH OF THE CELLS WITHIN A LAYOUT

OR

227 IDENTIFY A LAYOUT SEQUENCE BY WHICH EACH OF THE LAYOUTS IN THE PLURALITY OF LAYOUTS IS RENDERED WITHIN THE LAYOUT REGION

228 RENDER THE PLURALITY OF LAYOUTS ACCORDING TO THE LAYOUT SEQUENCE

*FIG. 7*

229 SELECT THE LAYOUT, FROM THE PLURALITY OF LAYOUTS, FOR RENDERING WITHIN A LAYOUT REGION, BASED ON THE WHITE SPACE AREA

230 DETERMINE A PREFERRED LAYOUT ASSOCIATED WITH A MINIMUM WHITE SPACE AREA

231 IDENTIFY A PLURALITY OF PREFERRED LAYOUTS

232 SELECT A PREFERRED LAYOUT FROM THE PLURALITY OF PREFERRED LAYOUTS, THE PREFERRED LAYOUT MOST RECENTLY RENDERED WITHIN THE LAYOUT REGION

*FIG. 8*

METHODS AND APPARATUS FOR EFFICIENT LAYOUT OF DIGITAL CONTENT

BACKGROUND

Conventional computerized devices, such as personal computers, laptop computers, and the like utilize graphical user interface in applications such as operating systems and graphical editors (i.e., web page editors, document editors, etc.) that enable users to quickly provide input and create projects using "What You See Is What You Get" (WYSIWYG) technology. In general, using a graphical user interface, a user operates an input device such as a mouse or keyboard to manipulate digital content on a computer display. The digital content is often represented as icons, and the user can operate an input device such as a mouse to move a mouse pointer onto an icon (i.e. graphically overlapping the icon on the graphical user interface). By depressing a mouse button, the application (such as the operating system desktop) selects the icon, and if the user maintains the mouse button in a depressed state, the user can drag the icon across the graphical user interface. By releasing the mouse button, the icon is placed on the graphical user interface at the current position of the mouse pointer.

Using graphical user interface technology, users can create projects by dragging and dropping digital content (i.e., graphical objects, text, text boxes, images, etc) into the project. Projects such as a storyboard, magazine, catalog, etc., may have individual sections of the projects that each have a layout. For example, a project designer specifies a layout of each of the individual pages that comprise the pages of a catalog. The layout is, essentially, the placement of each of the digital content within the individual page of the catalog. Typically, layout tools provide a preview feature that dissects the layout region into a grid of evenly sized cells, allowing the project designer to place the digital content within each of the cells in the layout. Each of the digital content is resized proportionally to fit into the respective cell. The remaining portion of the cell not filled by the proportionally resized digital content is called white space area.

SUMMARY

Conventional technologies for creating a layout of digital content suffer from a variety of deficiencies. In particular, conventional technologies for creating a layout of digital content are limited in that conventional technologies are inefficient, and result in excess (and unnecessary) white space area. Conventional technologies divide the layout region (i.e., the area encompassed by the layout) into equally sized cells into which each of the digital content is placed. Each of the digital content (i.e., graphical objects, text, text boxes, images, etc) is proportionally resized. This results in white space area in some of the cells (i.e., those cells where the proportionally resized digital content does not encompass the total area of the individual cell). The creation of equally sized cells results in excessive white space area, reducing the overall efficiency of space of the digital content within the layout. While a small border around each of the digital content may increase the ability to distinguish one digital content from another, excessive white space area creates the illusion of large gaps within the layout, indicating that digital content is missing.

Embodiments disclosed herein significantly overcome such deficiencies and provide a system that includes a computer system executing a layout selecting process within a graphical user interface. The layout selecting process receives a plurality of digital content, for example, from a user. The layout selecting process determines a total number of possible layouts within the layout region, based on the number of each of the digital content within the plurality of digital content. The layout selecting process iteratively calculates the amount of white space area for each of the possible layouts, and selects the layout having the least white space area. The layout selecting process then renders that selected layout on a graphical user interface. If a user resizes the layout region, the layout selecting process, again, iteratively calculates the amount of white space area for each of the possible layouts within the newly resized layout region. The layout selecting process selects the layout having the least white space area, and renders that selected layout within the newly resized layout region.

For each of the a total number of possible layouts within the layout region, the layout selecting process determines a number of rows within the layout, and a number of cells within each of the rows in the layout. Each row is the same width as the layout region. The height of each of the rows is the height of the layout region divided by the number of rows. The height of each cell within each row is equal to the height of the row. The width of each cell is calculated by dividing the row by the number of cells within that row. Each of the digital content is rendered within a respective cell, while maintaining the aspect ratio of the digital content.

The layout selecting process calculates the area of the cell, and the area of the proportionally resized digital content within the cell. From these two values, the white space area for each cell is calculated. The layout selecting process then calculates the cumulative white space area for each of the possible layouts, and selects the layout having the least amount of white space area.

The layout selecting process receives a plurality of digital content. The layout selecting process renders the plurality of digital content in a plurality of layouts. Each of the plurality of layouts comprises the plurality of digital content arranged in a plurality of cells within the layout. The layout selecting process calculates a white space area (comprising a cumulative area calculated from an area within each of the cells not contained by the respective digital content) for each of the plurality of layouts. The layout selecting process selects a layout (based on the white space area) from the plurality of layouts, and renders that layout within a layout region.

During an example operation of one embodiment, suppose a user, such as a graphic designer wishes to create a layout with the least amount of wasted white space area. The graphic designer provides a plurality of digital content, such as graphical objects. As the graphic designer selects some of the graphical objects, for example, five graphical objects, the layout selecting process determines the total possible number of layouts. For example, the layout of the five graphical objects might be:

i) five graphical objects across one row
ii) five rows each containing one graphical object
iii) two rows, one row containing one graphical object and the other row containing four graphical objects, and
iv) two rows, one row containing two graphical objects and one row containing three graphical objects.

The layout selecting process calculates the total white space for each of the layouts. In the instance where two layouts each result in the same amount of white space area, the layout selecting process selects the most recently calculated layout. For example, the scenario of two rows, a first row containing two graphical objects and a second row containing three graphical objects results in the same amount of white space area as the scenario of two rows, a first row containing three graphical objects and a second row containing two graphical objects. Since the scenario of two rows, a first row containing three graphical objects and a second row containing two graphical objects was calculated most recently, the layout selecting process selects that layout as the layout to render on the graphical user interface.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc., of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 6 illustrates a flowchart of a procedure performed by the system of FIG. 1 when the layout selecting process renders the plurality of digital content in a plurality of layouts, and renders each of the plurality of digital content within each of the respective cells within the plurality of cells, according to one embodiment disclosed herein.

FIG. 7 illustrates a flowchart of a procedure performed by the system of FIG. 1 when the layout selecting process calculates a white space area for each of the plurality of layouts, the white space area comprising a cumulative area calculated from an area within each of the cells not contained by the respective digital content, according to one embodiment disclosed herein.

FIG. 8 illustrates a flowchart of a procedure performed by the system of FIG. 1 when the layout selecting process selects the layout, from the plurality of layouts, for rendering within a layout region, based on the white space area, according to one embodiment disclosed herein.

DETAILED DESCRIPTION

Embodiments disclosed herein include methods, software and a computer system that perform a layout selecting process within a graphical user interface. The layout selecting process receives a plurality of digital content, for example, from a user. The layout selecting process determines a total number of possible layouts within the layout region, based on the number of each of the digital content within the plurality of digital content. The layout selecting process iteratively calculates the amount of white space area for each of the possible layouts, and selects the layout having the least white space area. The layout selecting process then renders that selected layout on a graphical user interface. If a user resizes the layout region, the layout selecting process, again, iteratively calculates the amount of white space area for each of the possible layouts within the newly resized layout region. The layout selecting process selects the layout having the least white space area, and renders that selected layout within the newly resized layout region.

For each of the a total number of possible layouts within the layout region, the layout selecting process determines a number of rows within the layout, and a number of cells within each of the rows in the layout. Each row is the same width as the layout region. The height of each of the rows is the height of the layout region divided by the number of rows. The height of each cell within each row is equal to the height of the row. The width of each cell is calculated by dividing the row by the number of cells within that row. Each of the digital content is rendered within a respective cell, while maintaining the aspect ratio of the digital content.

The layout selecting process calculates the area of the cell, and the area of the proportionally resized digital content within the cell. From these two values, the white space area for each cell is calculated. The layout selecting process then calculates the cumulative white space area for each of the possible layouts, and selects the layout having the least amount of white space area.

The layout selecting process receives a plurality of digital content. The layout selecting process renders the plurality of digital content in a plurality of layouts. Each of the plurality of layouts comprises the plurality of digital content arranged in a plurality of cells within the layout. The layout selecting process calculates a white space area (comprising a cumulative area calculated from an area within each of the cells not contained by the respective digital content) for each of the plurality of layouts. The layout selecting process selects a layout (based on the white space area) from the plurality of layouts, and renders that layout within a layout region.

Figure 1:
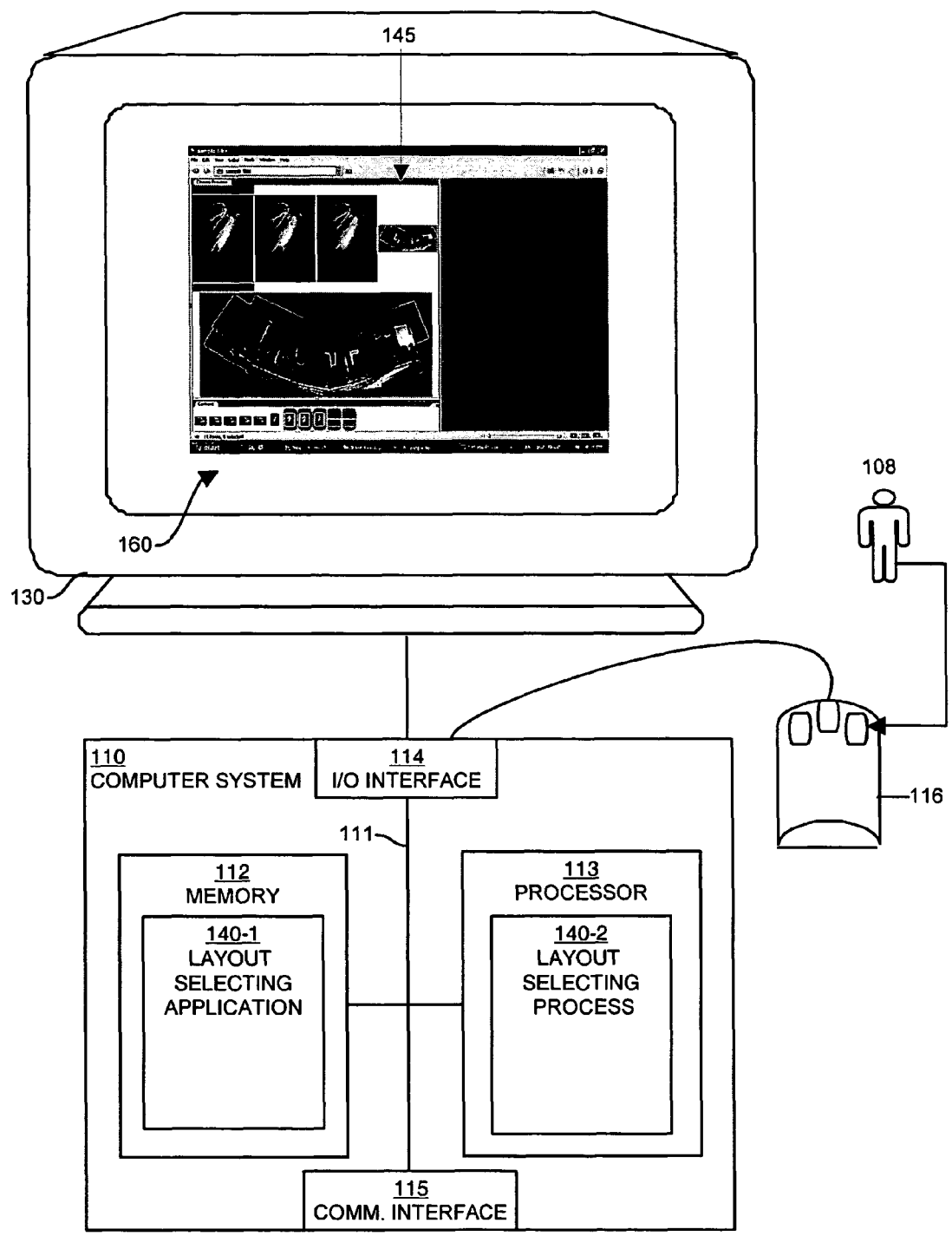
FIG. 1 shows a high-level block diagram of a computer system according to one embodiment disclosed herein.

FIG. 1 is a block diagram illustrating example architecture of a computer system 110 that executes, runs, interprets, operates or otherwise performs a layout selecting application 140-1 and layout selecting process 140-2 suitable for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the layout selecting application 140-1 and process 140-2 provides on the display 130. The graphical user interface 160 displays a layout 145. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a layout selecting application 140-1 as explained herein. The layout selecting application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the layout selecting application 140-1. Execution of the layout selecting application 140-1 in this manner produces processing functionality in a layout selecting process 140-2. In other words, the layout selecting process 140-2 represents one or more portions or runtime instances of the layout selecting application 140-1 (or the entire layout selecting application 140-1) performing or executing within or upon the processor 113 in the computerized device 110 at runtime.

It is noted that example configurations disclosed herein include the layout selecting application 140-1 itself (i.e., in the form of un-executed or non-performing logic instructions and/or data). The layout selecting application 140-1 may be stored on a computer readable medium (such as a floppy disk), hard disk, electronic, magnetic, optical, or other computer readable medium. The layout selecting application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the layout selecting application 140-1 in the processor 113 as the layout selecting process 140-2. Those skilled in the art will understand that the computer system 110 may include other processes and/or software and hardware components, such as an operating system not shown in this example.

A display 130 need not be coupled directly to computer system 110. For example, the layout selecting application 140-1 can be executed on a remotely accessible computerized device via the network interface 115. In this instance, the graphical user interface 160 may be displayed locally to a user 108 of the remote computer, and execution of the processing herein may be client-server based.

Figure 2:
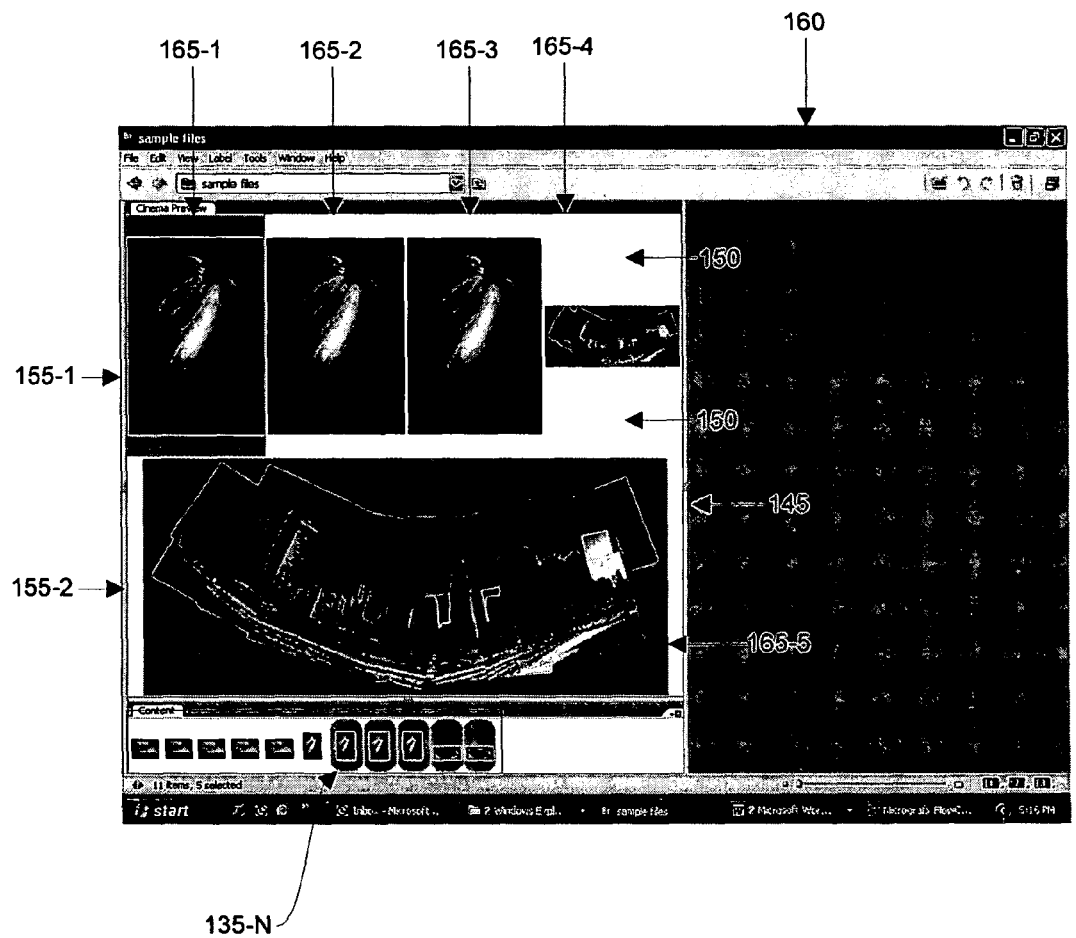
FIG. 2 shows an example screenshot of a graphical user interface displaying a layout, according to one embodiment disclosed herein.

FIG. 2 displays an example screen shot of a graphical user interface 160 containing a layout 145. The layout 145 is divided into two rows, 155-1 and 155-2. Row 155-1 has four cells 165-1, 165-2, 165-3, and 165-4. Row 155-2 has one cell 165-5. Each of the digital content 135-N (within each of the cells 165-N) has been proportionately resized to maintain the aspect ratio. A user 108 selects the digital content 135-N from a taskbar on the graphical user interface 160. The layout selecting process 140-2 arranges the selected digital content 135-N in a layout 145. Cell 165-4 contains white space area 150.

Further details of configurations explained herein will now be provided with respect to a flow chart of processing steps that show the high level operations disclosed herein to perform the layout selecting process 140-2.

Figure 3:
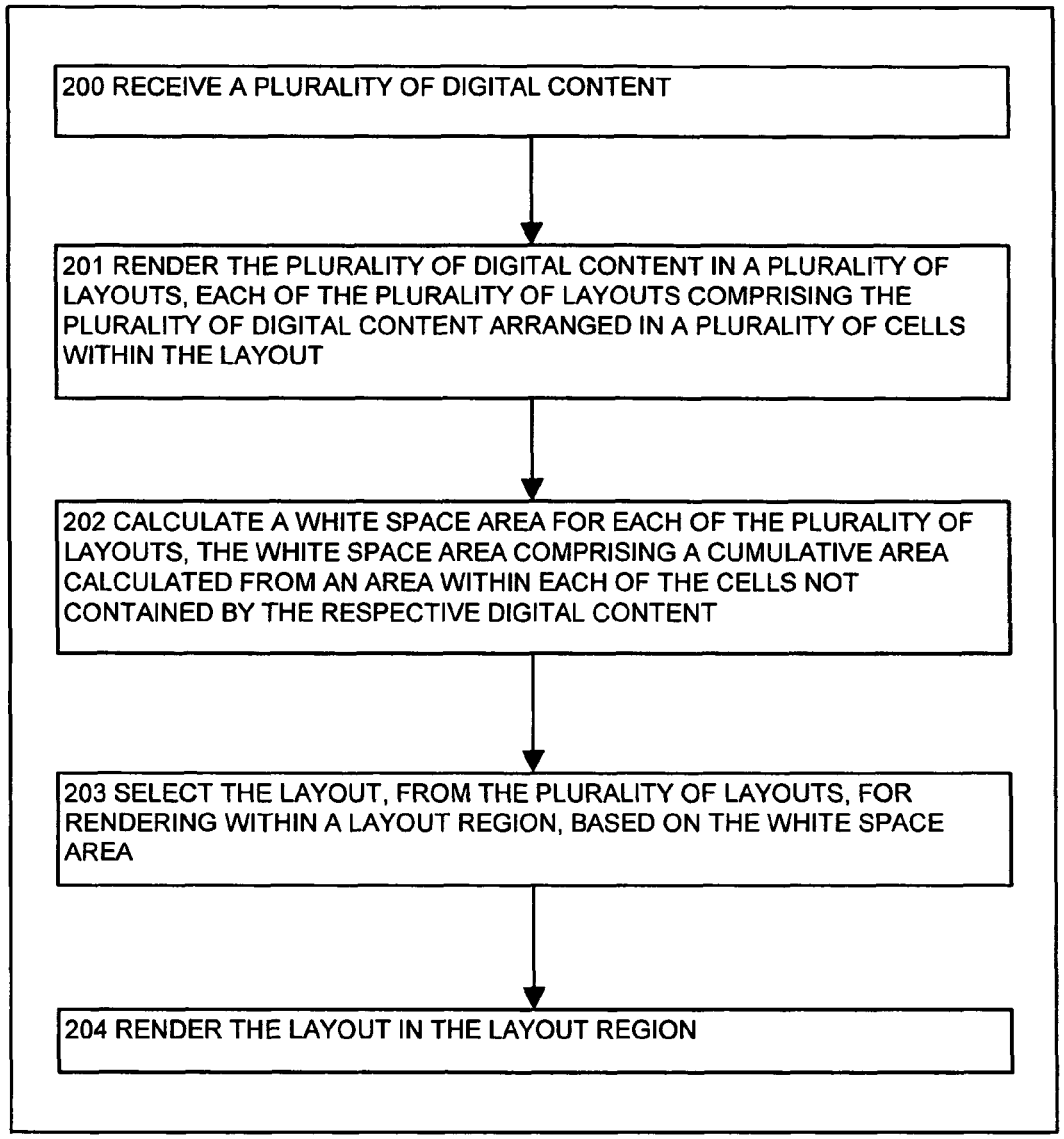
FIG. 3 illustrates a flowchart of a procedure performed by the system of FIG. 1 when the layout selecting process receives a plurality of digital content, according to one embodiment disclosed herein.

FIG. 3 is a flowchart of the steps performed by the layout selecting process 140-2 when it receives a plurality of digital content 135-N.

In step 200, the layout selecting process 140-2 receives a plurality of digital content 135-N. Digital content 135-N may be images, text, images and text combined, graphical objects, icons, etc. In an example embodiment, the graphical user interface 160 has a task bar containing the plurality of digital content 135-N, and a layout region. A user 108 selects digital content 135-N from the plurality of digital content 135-N to display within the graphical user interface 160.

In step 201, the layout selecting process 140-2 renders the plurality of digital content 135-N in a plurality of layouts 145. Each of the plurality of layouts 145 comprises the plurality of digital content 135-N arranged in a plurality of cells 165-N within the layout 145. In an example embodiment, the layout 145 is divided into rows 155-N. Cells 165-N are distributed within each of the rows 155-N. Each of the rows 155-N may have a different number of cells 165-N. For example, a first row 155-1 may have two cells 165-N, a second row 155-2 may have three cells 165-N, and a third row (not shown) may have two cells 165-N.

In step 202, the layout selecting process 140-2 calculates a white space area 150 for each of the plurality of layouts 145-N. The white space area 150 comprises a cumulative area calculated from an area within each of the cells 165-N not contained by the respective digital content 135-N. The layout selecting process 140-2 inserts digital content 135-N into each cell 165-N, maintaining the aspect ration for the digital content 135-. In other words, the digital content 135-N is proportionally resized to fit into the cell 165-N while still retaining the proportion aspects of the digital content 135-N. In some embodiments, the proportionally re-sized digital content 135-N does not cover all of the area of the cell 165-N. This area is the white space area 150. In other words, the white space are 150 is the portion of the layout not covered by digital content 135-N.

In step 203, the layout selecting process 140-2 selects the layout 145 (for rendering within the layout region), from the plurality of layouts 145. The layout region is an area on the graphical user interface 160 in which the layout 145 is rendered. The layout selecting process 140-2 calculates the white space area 150 for each layout, and selects a layout 145 based on the white space area 150.

In step 204, the layout selecting process 140-2 renders the layout 145 in the layout region. The layout selecting process 140-2 selects a layout 145 from the plurality of possible layouts 145, and renders that selected layout 145 on the graphical user interface 160.

Figure 4:
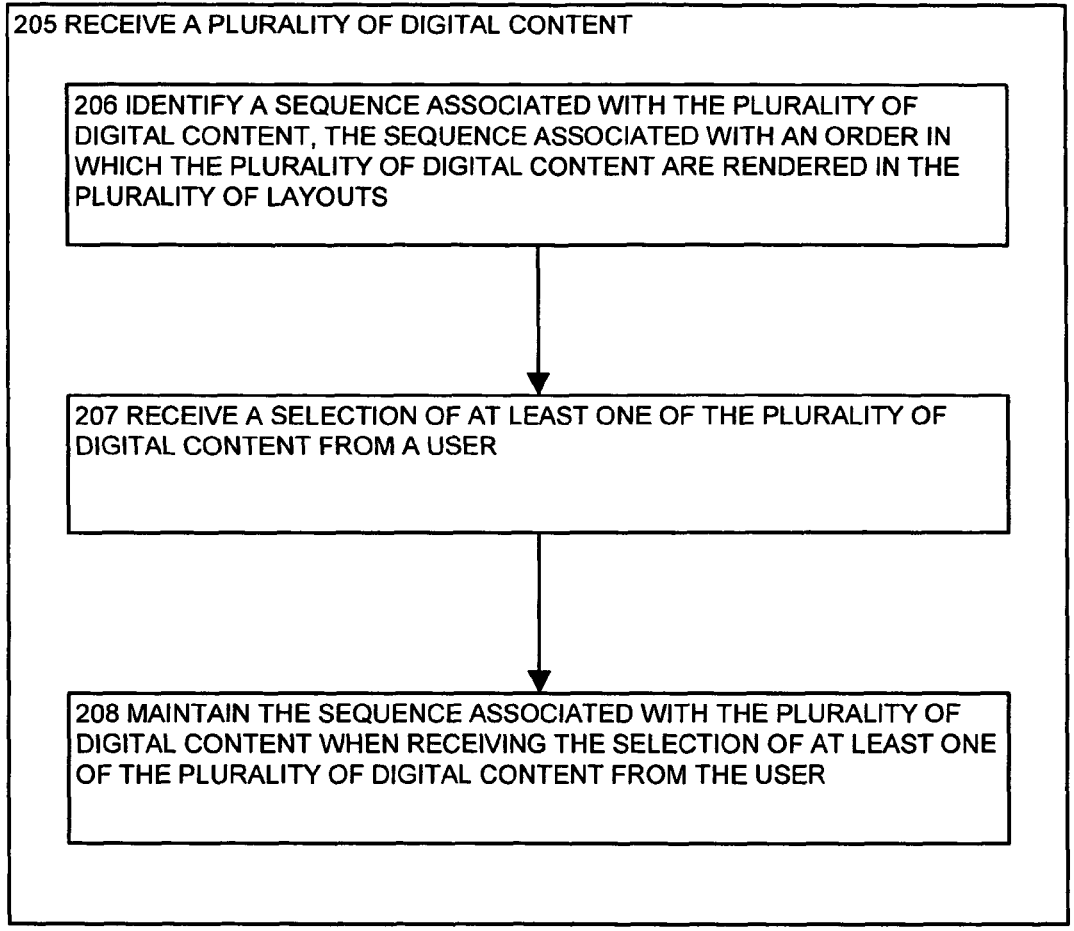
FIG. 4 illustrates a flowchart of a procedure performed by the system of FIG. 1 when the layout selecting process receives a plurality of digital content, and identifies a sequence associated with the plurality of digital content, according to one embodiment disclosed herein.

FIG. 4 is a flowchart of the steps performed by the layout selecting process 140-2 when it receives a plurality of digital content 135-N.

In step 205, the layout selecting process 140-2 receives a plurality of digital content 135-N. In an example embodiment, a user 108 has selected the digital content 135-N that is to be placed on a task bar within the graphical user interface 160. Those digital content 135-N placed on the taskbar are the digital content 135-N from which digital content 135-N will be selected (to be arranged within a layout 145 in a layout region on the graphical user interface 160).

In step 206, the layout selecting process 140-2 identifies a sequence associated with the plurality of digital content 135-N. The sequence is associated with an order in which the plurality of digital content 135-N are rendered in the plurality of layouts 145. In an example embodiment, a user 108 places the digital content 135-N on a task bar in the graphical user interface 160. The user 108 specifies an order to the digital content 135-N on the task bar. The layout selecting process 140-2 identifies the order of the digital content 135-N to be the same order in which the digital content 135-N is rendered on the taskbar of the graphical user interface 160.

In step 207, the layout selecting process 140-2 receives a selection of at least one of the plurality of digital content 135-N from a user 108. In an example embodiment, a user 108 selects which of the digital content 135-N on the taskbar that will be arranged within a layout 145. For example, the user 108, using an input device 116, such as a mouse, selects some of the digital content 135-N from the plurality of digital content 135-N on the task bar.

In step 208, the layout selecting process 140-2 maintains the sequence associated with the plurality of digital content 135-N when receiving the selection of at least one of the plurality of digital content 135-N from the user 108. In an example embodiment, regardless of the order in which the user 108 selects the digital content 135-N from the taskbar, the layout selecting process 140-2 arranges the digital content 135-N within the layout based on the order in which the digital content 135-N is rendered the taskbar. In other words, if the task bar contains 10 digital content 135-N items, and the user selects the last digital content 135-10 on the taskbar, then the second to last digital content 135-9 on the task bar, and finally the first digital content 135-1 on the taskbar, the layout selecting process 140-2 will place the digital content 135-N within the layout 145 with the first digital content 135-1 first, the second to last digital content 135-9 second and the last digital content 135-10 last.

Figure 5:
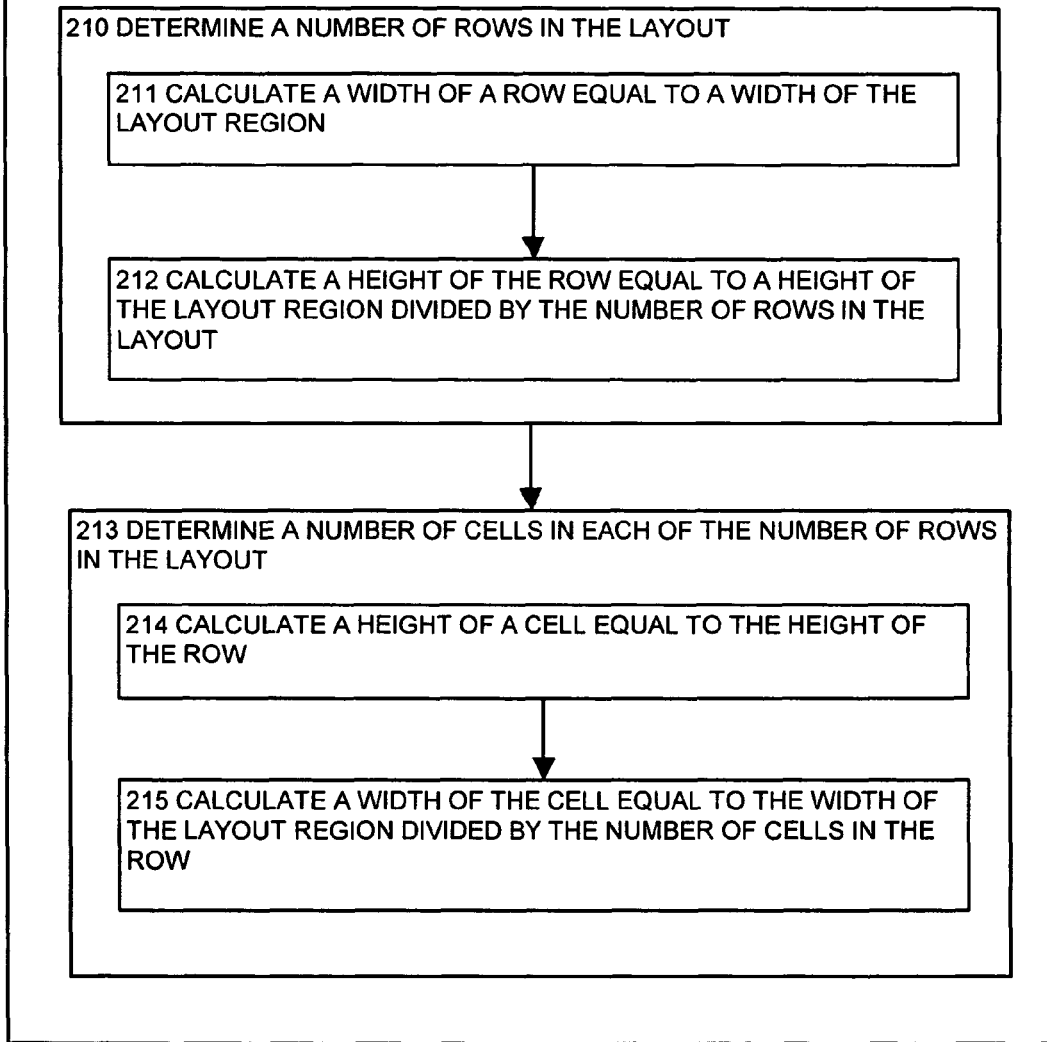
FIG. 5 illustrates a flowchart of a procedure performed by the system of FIG. 1 when the layout selecting process renders the plurality of digital content in a plurality of layouts, each of the plurality of layouts comprising the plurality of digital content arranged in a plurality of cells within the layout, according to one embodiment disclosed herein.

FIG. 5 is a flowchart of the steps performed by the layout selecting process 140-2 when it renders the plurality of digital content 135-N in a plurality of layouts 145.

In step 209, the layout selecting process 140-2 renders the plurality of digital content 135-N in a plurality of layouts 145. Each of the plurality of layouts 145 comprises the plurality of digital content 135-N arranged in a plurality of cells 165-N within the layout 145. The plurality of cells 165-N is arranged within a plurality of rows 155-N.

In step 210, the layout selecting process 140-2 determines a number of rows 155-N in the layout 145. In an example embodiment, the layout selecting process 140-2 determines a maximum number of rows that the digital content 135-N can be arranged into based on the number of digital content 135-N items within the plurality of digital content 135-N selected by, for example, a user 108.

In step 211, the layout selecting process 140-2 calculates that the width of the row 155-1 is equal to a width of the layout region.

In step 212, the layout selecting process 140-2 calculates that the height of a row is equal to a height of the layout region divided by the number of rows 155-N in the layout 145.

In step 213, the layout selecting process 140-2 determines a number of cells 165-N in each of the number of rows 155-N in the layout 145. In an example embodiment, each row 155-N may have a different number of cells 165-N. A first row 155-1 may have three cells 165-1, 165-2 and 165-3, while a second row 155-2 may have two cells 165-4 and 165-5.

In step 214, the layout selecting process 140-2 calculates that the height of a cell 165-N is equal to the height of the row 155-N.

In step 215, the layout selecting process 140-2 calculates that a width of the cell 165-N is equal to the width of the layout region divided by the number of cells 165-M in the row 155. In other words, the cells 165-N are equally spaced across each row 155-N.

FIG. 6 is a flowchart of the steps performed by the layout selecting process 140-2 when it renders the plurality of digital content 135-N in a plurality of layouts 145.

In step 216, the layout selecting process 140-2 renders the plurality of digital content 135-N in a plurality of layouts 145. Each of the plurality of layouts 145 comprises the plurality of digital content 135-N arranged in a plurality of cells 165-N within the layout 145. The cells 165-N are arranged within rows 155-N.

In step 217, the layout selecting process 140-2 renders each of the plurality of digital content 135-N within each of the respective cells 165-N within the plurality of cells 165-N. Each of the digital content 135-N is rendered maintaining an aspect ratio of each of the digital content 135-N within each of the respective cells 165-N. In other words, the layout selecting process 140-2 arranges each of the digital content 135-N (such as images) within a respective cell 165-N. Each digital content 135-N is rendered within the cell 165-N to fit into the cell 165-N while maintaining the aspect ratio (i.e., proportion) of the digital content 135-N with respect to that cell 165-N.

In step 218, the layout selecting process 140-2 identifies a cell height and a cell width for each of the cells 165-N. In an example embodiment, cells 165-N within the same row 155-N will have the same cell height and cell width. However, cells 165-N within different rows 155-N may have a different cell height and cell width. In an example embodiment, the rows 155-N are all the same height. Therefore, all of the cells 165-N within the rows 155-N are the same height in the layout 145.

In step 219, the layout selecting process 140-2 identifies a digital content height and a digital content width for each of the digital content 135-N.

In step 220, the layout selecting process 140-2 identifies a first dimension of the cell 165-N. The first dimension is selected from the cell height and the cell width. In an example embodiment, the layout selecting process 140-2 selects the height of the cell 165-N as the first dimension. In another example embodiment, the layout selecting process 140-2 selects the width of the cell 165-N as the first dimension.

In step 221, the layout selecting process 140-2 identifies a first dimension of the digital content 135-N. The first dimension is selected from the digital content height and the digital content width.

In step 222, the layout selecting process 140-2 modifies the first dimension of the digital content 135-N to equal the first dimension of the cell 165-N.

In step 223, the layout selecting process 140-2 proportionally modifies a second dimension of the digital content 135-N to fit within the cell 165-N. The second dimension of the digital content 135-N is the dimension of the digital content 135-N not selected as the first dimension. The modifying of the second dimension of the digital content maintains the aspect ratio of the digital content 135-N. In an example embodiment, the layout selecting process 140-2 selects the height of the digital content 135-N as the first dimension and proportionally resizes the width of the digital content 135-N accordingly such that the digital content 135-N fits into the cell 165-N while maintaining the proper aspect ratio. In another example embodiment, the layout selecting process 140-2 selects the width of the digital content 135-N as the first dimension, and proportionally resizes the height of the digital content 135-N accordingly such that the digital content 135-N fits into the cell 165-N while maintaining the proper aspect ratio.

FIG. 7 is a flowchart of the steps performed by the layout selecting process 140-2 when it calculates a white space area 150 for each of the plurality of layouts 145.

In step 224, the layout selecting process 140-2 calculates a white space area 150 for each of the plurality of layouts 145. The white space area 150 comprises a cumulative area calculated from an area within each of the cells 165-N not contained by the respective digital content 135-N. As each of the digital content 135-N is proportionally resized to fit within each cell 165-N, some of the digital content 135-N do not encompass the total area of the cell 165-N. The remaining area of the cell 165-N is the white space area 150.

For each of the cells 165-N within each of the plurality of layouts 145, in step 225, the layout selecting process 140-2 determines the white space area 150 by calculating a difference between:

i) An area of the cell 165-N. The area of the cell comprises a height and width of the cell 165-N.

ii) An area of the digital content 135-N within each of the cells 165-N. The area of the digital content 135-N comprises a height and width of the digital content 135-N. In other words, the layout selecting process 140-2 calculates that area of the cell 165-N that is not covered by the proportionally resized digital content 135-N within that cell 165-N.

For each of the layouts 145 within the plurality of layouts 145, in step 226, the layout selecting process 140-2 calculates a cumulative white space area 150 comprising a summation of each of the white space areas 150 for each of the cells 165-N within a layout 145. The layout selecting process 140-2 arranges the digital content 135-N within each of the possible layouts 145 for that selection of digital content 135-. Within each cell 165-N of each layout 145, the layout selecting process 140-2 calculates the white space area 150. The layout selecting process 140-2 then calculates the total white space area 150 for each layout 145.

In step 227, the layout selecting process 140-2 identifies a layout sequence by which each of the layouts 145 in the plurality of layouts 145 is rendered within the layout region. In an example embodiment, the sequence of the layouts 145 is dynamically determined. In another example embodiment, the sequence of the layouts 145 is predetermined based on an algorithm. In an example embodiment, the algorithm is as follows:

```
// some constants to constrain the number of layouts
static const unum32 kMaxLayoutRows=9;
static const unum32 kMaxLayoutColumns=9;
static const unum32 kMaxCells=9;
// layout data structure
struct Layout
{
   unum32 row[kMaxLayoutColumns];
   unum32 numRows;
   unum32 numCells;
};
// STL vector to hold defined layouts
typedef std::vector<Layout> Layouts;
// sample code for setting up a layout for 3 cells
if (numCells==3)
{
   // tell the layout how many cells it can display
   layout.numCells=3;
   //3
   layout.numRows=1;
   layout.row[0]=3;
   layouts.push_back(layout);
   //2+1
   layout.numRows=2;
   layout.row[0]=2;
   layout.row[1]=1;
   layouts.push_back(layout);
   //1+2
   layout.numRows=2;
   layout.row[0]=1;
   layout.row[1]=2;
   layouts.push_back(layout);
   //1+1+1
   layout.numRows=3;
   layout.row[0]=1;
   layoutsow[1]=1;
   layout.row[2]=1;
   layouts.push_back(layout);
}
```

In step 228, the layout selecting process 140-2 renders the plurality of layouts 145 according to the layout sequence. The layout selecting process 140-2 determines the order in which the layouts 145 are rendered and then renders the plurality of layouts 145 according to that sequence.

FIG. 8 is a flowchart of the steps performed by the layout selecting process 140-2 when it selects the layout 145, from the plurality of layouts 145, for rendering within a layout region.

In step 229, the layout selecting process 140-2 selects the layout 145, from the plurality of layouts 145, for rendering within a layout region. The layout 145 is selected based on the white space area 150. For example, the layout 145 may be selected because that layout 145 has the least amount of white space area 150.

In step 230, the layout selecting process 140-2 determines a preferred layout 145 associated with a minimum white space area 150. In an example embodiment, the layout selecting process 140-2 calculates the white space area 150 for each of the layouts 145 within the plurality of layouts 145, determines the minimum white space area 150 of all the layouts 145 and then selects that layout 145 as the preferred layout 145.

In step 231, the layout selecting process 140-2 identifies a plurality of preferred layouts 145. In an example embodiment, there are five digital content 135-N items. The layout selecting process 140-2 renders a plurality of layouts 145. Each layout 145 has rows 155-N and cells 165-N within each row 155-N. For example, the layout of the five digital content 135-N might be:

i) five digital content 135-N across one row
ii) five rows each containing one digital content 135-N
iii) two rows, one row containing one digital content 135-N and the other row containing four digital content 135-N, and
iv) two rows, one row containing two digital content 135-N and one row containing three digital content 135-N.

In an example embodiment, two of the layouts 145 have the same amount of minimum white space area 150. For example, the layout 145 having two rows, one row containing one digital content 135-N and the other row containing four digital content 135-N, and the layout 145 having two rows, one row containing two digital content 135-N and one row containing three digital content 135-N has the same amount of white space area 150.

In step 232, the layout selecting process 140-2 selects a preferred layout 145 from the plurality of preferred layouts 145. The preferred layout 145 is the layout 145 most recently rendered within the layout region. In an example embodiment, the layout selecting process 140-2 renders the plurality of layouts 145 in the following order:

i) five digital content 135-N across one row
ii) five rows each containing one digital content 135-N
iii) two rows, one row containing one digital content 135-N and the other row containing four digital content 135-N, and
iv) two rows, one row containing two digital content 135-N and one row containing three digital content 135-N.

Two of the layouts 1) five rows each containing one digital content 135-N and 2) two rows, one row containing one digital content 135-N and the other row containing four digital content 135-N, have the same minimum white space area 150. Because the layout 145 containing two rows (one row containing one digital content 135-N and the other row containing four digital content 135-N) was calculated by the layout selecting process 140-2 after the layout with five rows (each row containing one digital content 135-N item), the layout selecting process 140-2 selects the layout 145 containing two rows (one row containing one digital content 135-N and the other row containing four digital content 135-) as the preferred layout 145.

Figure 9:
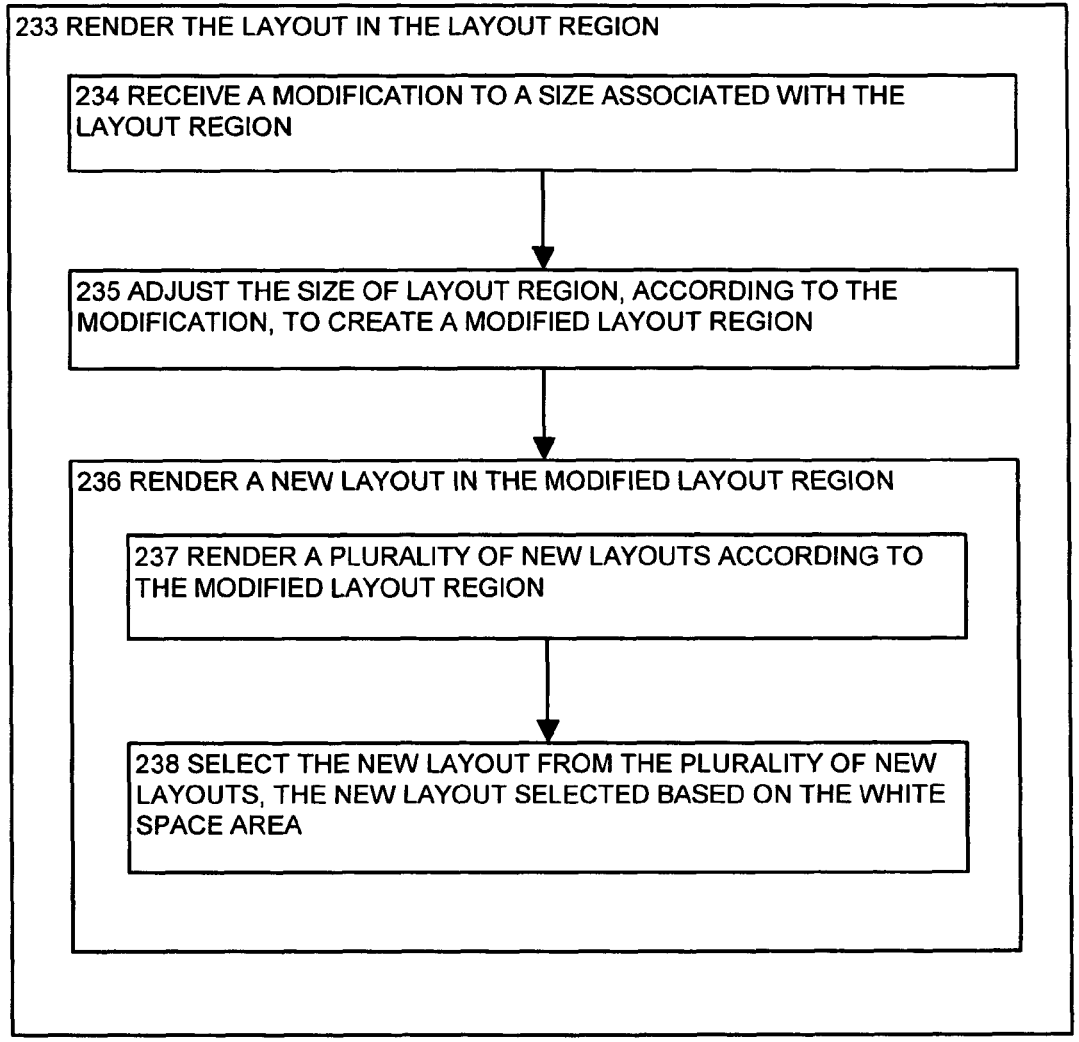
FIG. 9 illustrates a flowchart of a procedure performed by the system of FIG. 1 when the layout selecting process renders the layout in the layout region, according to one embodiment disclosed herein.

FIG. 9 is a flowchart of the steps performed by the layout selecting process 140-2 when it renders the layout 145 in the layout region.

In step 233, the layout selecting process 140-2 renders the layout 145 in the layout region. In an example embodiment, a user 108 selects digital content 135-N from a task bar on the graphical user interface 160. The layout selecting process 140-2 renders a plurality of layouts 145, calculates the white space area 150 for each of the layouts 145, and then selects the layout 145 with the least amount of white space area 150. The layout selecting process 140-2 then renders that selected layout 145 on the graphical user interface 160 within a layout region.

In step 234, the layout selecting process 140-2 receives a modification to a size associated with the layout region. In an example embodiment, a user 108 modifies the size of the layout region. The user 108 may perform this action by selection a corner of the layout region with an input device 116, such as a mouse, and moving the mouse to increase or reduce the size of the layout region.

In step 235, the layout selecting process 140-2 adjusts the size of layout region, according to the modification, to create a modified layout region. As a user 108 modifies the size of the layout region, the layout selecting process 140-2 renders the layout region according to the user's 108 modifications.

In step 236, the layout selecting process 140-2 renders a new layout 145 in the modified layout region. In an example embodiment, when a user 108, using an input device 116, such as mouse, modifies the size of the layout region, upon receiving notification that the user 108 has released the mouse (i.e., indicating that the resizing of the layout region is complete), the layout selecting process 140-2 renders a new layout 145 in the layout region.

In step 237, the layout selecting process 140-2 renders a plurality of new layouts 145 according to the modified layout region. The layout selecting process 140-2 identifies the plurality of digital content 135-N selected by the user 108 to be arranged within a layout 145. The layout selecting process 140-2 determines the plurality of layouts 145 for that selection of digital content 135-N, and renders each of the plurality of layouts 145 within the modified layout region.

In step 238, the layout selecting process 140-2 selects the new layout 145 from the plurality of new layouts 145. The new layout 145 is selected based on the white space area 150. In other words, as a user 108 modifies the size of the layout region, the layout selecting process 140-2 iteratively performs the steps of rendering layouts 145, calculating the white space are 150 of those layouts 145 and selecting the layout 145 with the least amount of white space area 150.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A computer-implemented method in which at least one computer system accesses instructions from computer storage and executes the instructions to perform steps comprising of:

receiving a plurality of digital content; rendering the plurality of digital content in a plurality of layouts, each of the plurality of layouts comprising the plurality of digital content arranged in a plurality of cells within the layout; calculating a white space area for each of the plurality of layouts, the white space area comprising a cumulative area calculated from an area within each of the cells not contained by the respective digital content; selecting the layout, from the plurality of layouts, for rendering within a layout region, based on the white space area, wherein selecting the layout includes determining a preferred layout associated with a minimum white space area; and wherein rendering the plurality of digital content in the plurality of layouts includes mapping each portion of the digital content to a respective cell provided in a first layout; and mapping each portion of the digital content to a respective cell provided in at least a second layout.

2. The computer-implemented method of claim 1 comprising:

rendering the layout in the layout region.

3. The computer-implemented method of claim 2 wherein rendering the layout in the layout region comprises:

receiving a modification to a size associated with the layout region;

adjusting the size of layout region, according to the modification, to create a modified layout region; and rendering a new layout in the modified layout region.

4. The computer-implemented method of claim 3 wherein rendering a new layout in the modified layout region comprises:

rendering a plurality of new layouts according to the modified layout region; and selecting the new layout from the plurality of new layouts, the new layout selected based on the white space area.

5. The computer-implemented method of claim 1 wherein receiving a plurality of digital content comprises:

identifying a sequence associated with the plurality of digital content, the sequence associated with an order in which the plurality of digital content are rendered in the plurality of layouts;

receiving a selection of at least one of the plurality of digital content from a user; and maintaining the sequence associated with the plurality of digital content when receiving the selection of at least one of the plurality of digital content from the user.

6. The computer-implemented method of claim 1 wherein rendering the plurality of digital content in a plurality of layouts, each of the plurality of layouts comprising the plurality of digital content arranged in a plurality of cells within the layout comprises:

determining a number of rows in the layout; and determining a number of cells in each of the number of rows in the layout.

7. The computer-implemented method of claim 6 wherein determining a number of rows in the layout comprises:

calculating a width of a row equal to a width of the layout region; and calculating a height of the row equal to a height of the layout region divided by the number of rows in the layout.

8. The computer-implemented method of claim 6 wherein determining a number of cells in each of the number of rows in the layout comprises:

calculating a height of a cell equal to the height of the row; and calculating a width of the cell equal to the width of the layout region divided by the number of cells in the row.

9. The computer-implemented method of claim 1 wherein rendering the plurality of digital content in a plurality of layouts, each of the plurality of layouts comprising the plurality of digital content arranged in a plurality of cells within the layout comprises:

rendering each of the plurality of digital content within each of the respective cells within the plurality of cells, each of the digital content rendered maintaining an aspect ratio of each of the digital content within each of the respective cells.

10. The computer-implemented method of claim 9 wherein rendering each of the plurality of digital content within each of the respective cells within the plurality of cells comprises:

identifying a cell height and a cell width for each of the cells;

identifying a digital content height and a digital content width for each of the digital content;

identifying a first dimension of the cell, the first dimension selected from the cell height and the cell width;

identifying a first dimension of the digital content, the first dimension selected from the digital content height and the digital content width;

modifying the first dimension of the digital content to equal the first dimension of the cell; and proportionally modifying a second dimension of the digital content to fit within the cell, the second dimension of the digital content not selected as the first dimension, the modifying of the second dimension of the digital content maintaining the aspect ratio of the digital content.

11. The computer-implemented method of claim 1 wherein calculating a white space area for each of the plurality of layouts, the white space area comprising a cumulative area calculated from an area within each of the cells not contained by the respective digital content comprises:

for each of the cells within each of the plurality of layouts, determining the white space area by calculating a difference between:

iii) an area of the cell, the area of the cell comprising a height and width of the cell; and iv) an area of the digital content within each of the cells, the area of the digital content comprising a height and width of the digital content; and for each of the layouts within the plurality of layouts, calculating a cumulative white space area comprising a summation of each of the white space areas for each of the cells within a layout.

12. The computer-implemented method of claim 1 wherein rendering the plurality of digital content in a plurality of layouts, each of the plurality of layouts comprising the plurality of digital content arranged in a plurality of cells within the layout comprises:

identifying a layout sequence by which each of the layouts in the plurality of layouts is rendered within the layout region; and rendering the plurality of layouts according to the layout sequence.

13. The computer-implemented method of claim 1 wherein determining a preferred layout associated with a minimum white space area comprises:

identifying a plurality of preferred layouts; and selecting a preferred layout from the plurality of preferred layouts, the preferred layout most recently rendered within the layout region.

14. A computer readable medium encoded with computer programming logic that when executed on a process in a computerized device provides layout selection, the medium comprising:

instructions for receiving a plurality of digital content; instructions for rendering the plurality of digital content in a plurality of layouts, each of the plurality of layouts comprising the plurality of digital content arranged in a plurality of cells within the layout; instructions for calculating a white space area for each of the plurality of layouts, the white space area comprising a cumulative area calculated from an area within each of the cells not contained by the respective digital content; instructions for selecting the layout, from the plurality of layouts, for rendering within a layout region, based on the white space area, wherein the instructions for selecting the layout include instructions for determining a preferred layout associated with a minimum white space area; and wherein rendering the plurality of digital content in the plurality of layouts includes mapping each portion of the digital content to a respective cell provided in a first layout; and mapping each portion of the digital content to a respective cell provided in at least a second layout.

15. The computer readable medium of claim 14 wherein said instructions further comprises:
  instructions for rendering the layout in the layout region.

16. The computer readable medium of claim 15 wherein said instructions for rendering the layout in the layout region further comprises:
  instructions for receiving a modification to a size associated with the layout region;
  instructions for adjusting the size of layout region, according to the modification, to create a modified layout region; and
  instructions for rendering a new layout in the modified layout region.

17. The computer readable medium of claim 14 wherein said instructions for calculating a white space area for each of the plurality of layouts, the white space area comprising a cumulative area calculated from an area within each of the cells not contained by the respective digital content further comprises:
  for each of the cells within each of the plurality of layouts, instructions for determining the white space area by calculating a difference between:
    i) an area of the cell, the area of the cell comprising a height and width of the cell; and
    ii) an area of the digital content within each of the cells, the area of the digital content comprising a height and width of the digital content; and
  for each of the layouts within the plurality of layouts, instructions for calculating a cumulative white space area comprising a summation of each of the white space areas for each of the cells within a layout.

18. A computerized device comprising:
  a memory; a processor; a communications interface; an interconnection mechanism coupling the memory, the processor and the communications interface; wherein the memory is encoded with an layout selecting application that when executed on the processor is capable of selecting a layout on the computerized device by performing the operations of: receiving a plurality of digital content; rendering the plurality of digital content in a plurality of layouts, each of the plurality of layouts comprising the plurality of digital content arranged in a plurality of cells within the layout; calculating a white space area for each of the plurality of layouts, the white space area comprising a cumulative area calculated from an area within each of the cells not contained by the respective digital content; selecting the layout, from the plurality of layouts, for rendering within a layout region, based on the white space area, wherein selecting the layout includes determining a preferred layout associated with a minimum white space area; and wherein rendering the plurality of digital content in the plurality of layouts includes mapping each portion of the digital content to a respective cell provided in a first layout; and mapping each portion of the digital content to a respective cell provided in at least a second layout.

19. The computer-implemented method as in claim 1, wherein rendering the plurality of digital content in the plurality of layouts includes:
  mapping each portion of the digital content to a respective cell provided in a first layout; and
  mapping each portion of the digital content to a respective cell provided in at least a second layout.

20. The computer-implemented method as in claim 1, wherein determining the preferred layout associated with the minimum white space includes selecting from the group consisting of:
  identifying the first layout as the preferred layout upon determining the first layout will display less white space area than the second layout while accommodating display of the digital content; and identifying the second layout as the preferred layout upon determining the second layout will display less white space area than the first layout while accommodating display of the digital content.

21. The computer-implemented method as in claim 20, comprising:
  upon receiving a selection to resize one of the first layout and the second layout, repeating the steps of:
    mapping each portion of the digital content to respective cells provided in the first layout;
    mapping each portion of the digital content to respective cells provided in the second layout; and
    selecting one of: identifying the first layout as the preferred layout and identifying the second layout as the preferred layout.

* * * * *